United States Patent
Ford

(10) Patent No.: US 7,878,767 B2
(45) Date of Patent: Feb. 1, 2011

(54) CYCLONIC, DEBRIS REMOVING VALVE AND METHOD

(76) Inventor: Michael Brent Ford, 2716 Rio Vista, St. George, UT (US) 84790

( * ) Notice: Subject to any disclaimer, the term of this patent is extended or adjusted under 35 U.S.C. 154(b) by 811 days.

(21) Appl. No.: 11/854,123

(22) Filed: Sep. 12, 2007

(65) Prior Publication Data

US 2009/0068042 A1   Mar. 12, 2009

(51) Int. Cl.
F04B 39/10 (2006.01)
F16L 55/02 (2006.01)
E21B 43/00 (2006.01)

(52) U.S. Cl. .............. 417/53; 417/430; 417/555.2; 92/173; 137/533.11; 251/126; 166/105.2; 166/105.5

(58) Field of Classification Search ........... 417/53, 417/430, 555.2; 137/105.2, 105.5, 105.6, 137/533.11; 251/126; 92/173, 181 R, 181 P
See application file for complete search history.

(56) References Cited

U.S. PATENT DOCUMENTS 1,759,081 A * 5/1930 Anderson ............ 137/331
5,893,708 A * 4/1999 Nelson, II ............ 417/456
6,481,987 B2 * 11/2002 Ford ............ 417/554
6,685,451 B1 * 2/2004 Ivey ............ 417/555.2
6,817,409 B2 * 11/2004 Howard ............ 166/108
7,713,035 B2 * 5/2010 Ford ............ 417/430

* cited by examiner

Primary Examiner—Charles G Freay
(74) Attorney, Agent, or Firm—Jeffrey Weiss; Karen J. S. Fouts; Weiss & Moy, P.C.

(57) ABSTRACT

There is provided, in one embodiment, a ball valve for regulating the flow of petroleum fluids therethrough. The ball valve is capable of transitioning between an open and a closed position. The ball valve includes in one embodiment a hydraulic piston, containment union, ported stem, containment cage and drag plunger, and is adapted to regulate the flow of fluid northward through the valve. A ball and seat should be positioned above these components, so that the hydraulic piston may extend therethrough. More specifically, during a pump downstroke, fluid enters the drag plunger, moves northward through the containment cage and into the interior of the ported stem, exits the interior of the ported stem and enters a plurality of angled veins, which impart cyclonic motion on fluid passing northward therethrough, assisting in the removal of debris. Also during the downstroke, a pedestal portion of the hydraulic unseats the ball from the seat. During the upstroke, the piston withdraws, permitting the ball to come to rest on the seat, closing the valve.

19 Claims, 5 Drawing Sheets

CYCLONIC, DEBRIS REMOVING VALVE AND METHOD

FIELD OF THE INVENTION

The present invention relates to mechanical oil pumps actuated by sucker rod reciprocation. More particularly, the invention relates to the directional control of oil flow through the oil pump and to the positioning of ball and seat components within the oil pump utilizing a cyclonic, debris removing valve.

BACKGROUND OF THE INVENTION

As the natural pressure in a completed oil well gradually depletes, the well may require a means known as artificial lift to continue the flow of petroleum reserves from their subterranean location to the earth's surface. Various forms of artificial lift are known including, for example, gas injection, water injection, and mechanical pumping. Petroleum engineers select a form of artificial lift depending on a number of criteria including, for example, formation geology and economics. The sucker rod pump is a well-known kind of mechanical pump that is widely used in the petroleum industry.

The sucker rod pumping system typically includes a means of providing a reciprocating (up and down) mechanical motion located at the surface near the well head. A string of sucker rods—up to more than a mile in length—is connected to the mechanical means. The sucker rod string is fed through the well tubing down hole where it is connected to the pump.

As is generally known in the art, a sucker rod pump includes at least two separate valves as well as other pump components such as a barrel plunger, and anchor. Beginning at the south end, oil pumps generally include a standing valve, which has a ball therein, the purpose of which is to regulate the passage of oil (or other substance being pumped) from downhole into the pump, allowing the pumped matter to be moved northward out of the system and into the flow line, while preventing the pumped matter from dropping back southward into the hole. Oil is permitted to pass through the standing valve and into the pump by the movement of the ball off its seat, and oil is prevented from dropping back into the hole by the seating of the ball. North of the standing valve, coupled to the sucker rod, is a traveling valve. The purpose of the traveling valve is to regulate the passage of oil from within the pump northward in the direction of the flow line, while preventing the pumped oil from dropping back in the direction of the standing valve and hole.

Actual movement of the pumped substance through the system will now be discussed. Oil is pumped from a hole through a series of "downstrokes" and "upstrokes" of the oil pump, which motion is imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the traveling valve, the ball is located in the seated position, held there by the pressure from the oil that has been previously pumped.

On the downstroke, the ball in the traveling valve unseats, permitting the oil that has passed through the standing valve to pass therethrough. Also during the downstroke, the ball in the standing valve seats, preventing pumped oil from moving back down into the hole. The process repeats itself again and again, with oil essentially being moved in stages from the hole, to above the standing valve and in the oil pump, to above the traveling valve and out of the oil pump. As the oil pump fills, the oil passes through the pump and into the tubing. As the tubing is filled, the oil passes into the flow line, from which oil is taken to a storage tank or other such structure.

Presently known designs of sucker rod pumps suffer from several shortcomings in various areas of the design. The ball and seat components used in both the traveling valve and the standing valve are exposed to wear. The seat components are also subject to high pressures, particularly in deep wells, which can lead to cracking. Hence, it would be desired to develop sucker rod pumps having valves that display improved wear and cracking resistance.

A further disadvantage of presently-known sucker rod pump designs relates to sand control. Sand that is often produced along with petroleum can clog and foul pump components. Once sand enters the pump at a bottom, or southward, position, the sand must be managed in the pump apparatus. Hence, it would be desired to provide a sucker rod pump with improved sand control features. Further, it would be desired to limit sand or solids from entering the pump at the pump's lower position.

Still a further disadvantage of known sucker rods relates to the flow of petroleum and fluids through the pump. Pumps typically allow for the turbulent flow of fluids at high pressures. This turbulent flow promotes wear of pump components. It would be desired to provide a sucker rod pump with an improved flow control.

Hence there has been identified a need to provide an improved sucker rod pump and components therein. It is desired that the sucker rod pump be robust and provide an improved service life over known pumps, and thereby that the sucker rod pump provide an improved cost performance. It would further be desired that the sucker rod pump provide an improved pumping efficiency. It would also be desired that an improved sucker rod pump be compatible with existing petroleum production devices. The present invention addresses one or more of these needs.

SUMMARY OF THE INVENTION

In accordance with an embodiment of the present invention, a valve for a pumping system is disclosed. The valve comprises, in combination: a hydraulic piston having a north end and a south end and a pedestal at the north end thereof; a containment union having a north end and a south end and an interior passage therethrough; a ported stem having a north end and a south end; wherein the ported stem has a plurality of veins located on an exterior portion thereof, and extending in one of a west to east and an east to west direction; wherein a lower portion of each of the plurality of veins is open to an interior of the ported stem and wherein an upper portion of each of the plurality of veins is closed; wherein the ported stem further comprises a plurality of regions of increased circumference located on an exterior portion thereof, adapted to contact a lower portion of the containment union; wherein a lower interior portion of the ported stem defines a passage terminating at a north end thereof in a cap, and wherein there is fluid communication between the interior passage and the open lower portion of each of the plurality of veins; a containment cage having a north end and a south end and adapted to be reciprocally positioned over a portion of the ported stem and to be coupled at its north end to the south end of the containment union; wherein the containment cage further comprises an interior, annular rim proximate the south end thereof, and wherein the interior annular rim is configured to prevent movement of the regions of increased circumference thereby; and a drag plunger having a north end and a south end, and adapted to be coupled at its north end to the south end of the ported stem.

In accordance with another embodiment of the present invention, a valve for a pumping system is disclosed. The valve comprises, in combination: a hydraulic piston having a north end and a south end and a pedestal at the north end thereof; wherein the south end of the hydraulic piston has an exterior thread; a containment union having a north end and a south end and an interior passage therethrough; wherein the containment union has opposing wrench flats on an exterior surface thereof; a ported stem having a north end and a south end; wherein the ported stem has a plurality of veins located on an exterior portion thereof, and extending in one of a west to east and an east to west direction; wherein a lower portion of each of the plurality of veins is open to an interior of the ported stem and wherein an upper portion of each of the plurality of veins is closed; wherein the ported stem further comprises a plurality of regions of increased circumference located on an exterior portion thereof, adapted to contact a lower portion of the containment union; wherein a lower interior portion of the ported stem defines a passage terminating at a north end thereof in a cap, and wherein there is fluid communication between the interior passage and the open lower portion of each of the plurality of veins; wherein the north end of the ported stem has an interior threaded region, adapted to be threadably coupled with the exterior threaded region at the south end of the hydraulic piston; wherein the south end of the ported stem has an exterior threaded region; wherein the north end of the drag plunger has an interior threaded region, adapted to be threadably coupled with the exterior threaded region at the south end of the ported stem; a containment cage having a north end and a south end and adapted to be reciprocally positioned over a portion of the ported stem and to be coupled at its north end to the south end of the containment union; wherein the containment cage further comprises an interior, annular rim proximate the south end thereof, and wherein the interior annular rim is configured to prevent movement of the regions of increased circumference thereby; wherein the north end of the containment cage has an interior threaded region, adapted to be threadably coupled with the exterior threaded region at the south end of the containment union; and a drag plunger having a north end and a south end, and adapted to be coupled at its north end to the south end of the ported stem.

In accordance with a further embodiment of the present invention, a method for pumping fluid through a valve is disclosed. The method comprises: providing a valve for a pumping system comprising, in combination: a hydraulic piston having a north end and a south end and a pedestal at the north end thereof; a containment union having a north end and a south end and an interior passage therethrough; a ported stem having a north end and a south end; wherein the ported stem has a plurality of veins located on an exterior portion thereof, and extending in one of a west to east and an east to west direction; wherein a lower portion of each of the plurality of veins is open to an interior of the ported stem and wherein an upper portion of each of the plurality of veins is closed; wherein the ported stem further comprises a plurality of regions of increased circumference located on an exterior portion thereof, adapted to contact a lower portion of the containment union; wherein a lower interior portion of the ported stem defines a passage terminating at a north end thereof in a cap, and wherein there is fluid communication between the interior passage and the open lower portion of each of the plurality of veins; a containment cage having a north end and a south end and adapted to be reciprocally positioned over a portion of the ported stem and to be coupled at its north end to the south end of the containment union; wherein the containment cage further comprises an interior, annular rim proximate the south end thereof, and wherein the interior annular rim is configured to prevent movement of the regions of increased circumference thereby; and a drag plunger having a north end and a south end, and adapted to be coupled at its north end to the south end of the ported stem; and pumping fluid northward through the valve by causing the fluid to enter the south end of the drag plunger, to then enter the interior of the ported stem, to then exit the interior of the ported stem and to enter the plurality of veins, to then enter an interior of the containment cage, and to then enter the interior passage of the containment union.

Other independent features and advantages of the sucker rod pump with ball containment valve cage will become apparent from the following detailed description, taken in conjunction with the accompanying drawings which illustrate, by way of example, the principles of the invention.

DETAILED DESCRIPTION OF THE PREFERRED EMBODIMENTS

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
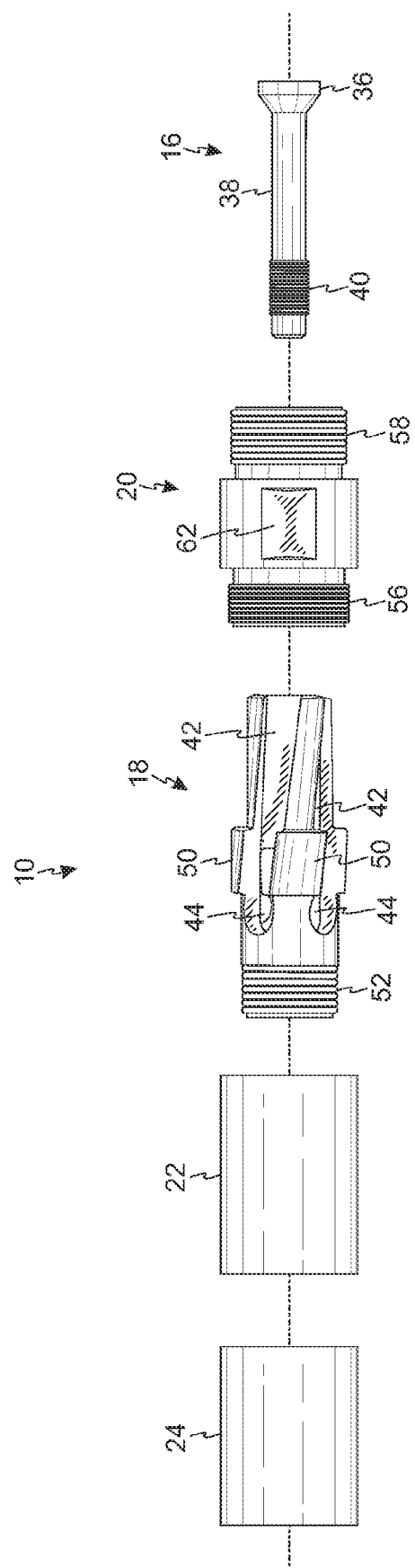
FIG. 1 is a side, exploded view of a cyclonic, debris removing valve consistent with an embodiment of the present invention.
Figure 2:
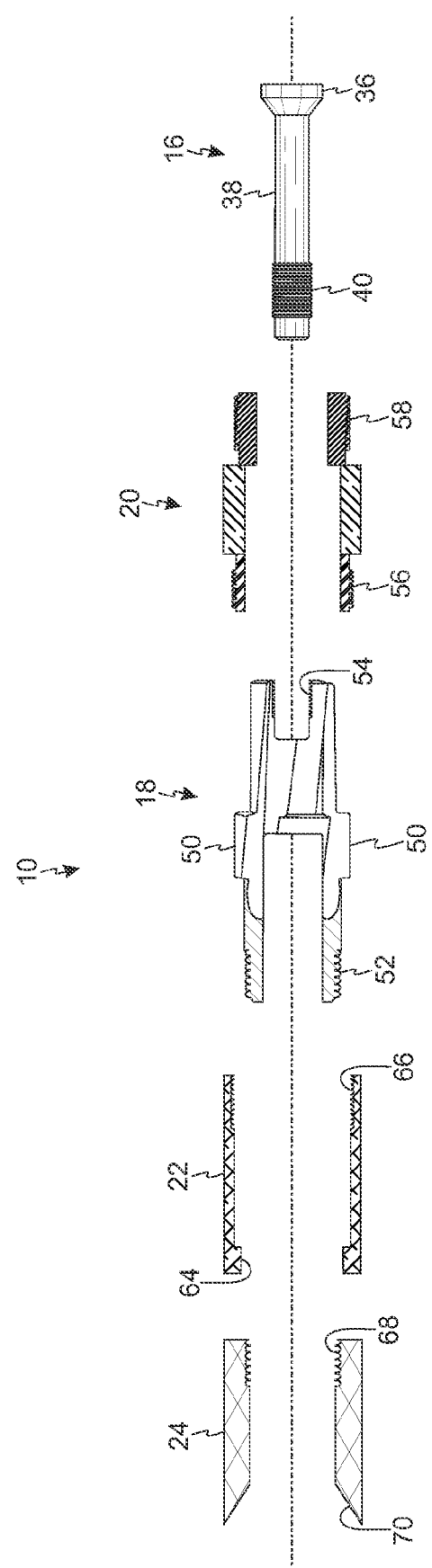
FIG. 2 is a side, cross-sectional, exploded view of the cyclonic debris removing valve of FIG. 1.
Figure 3:
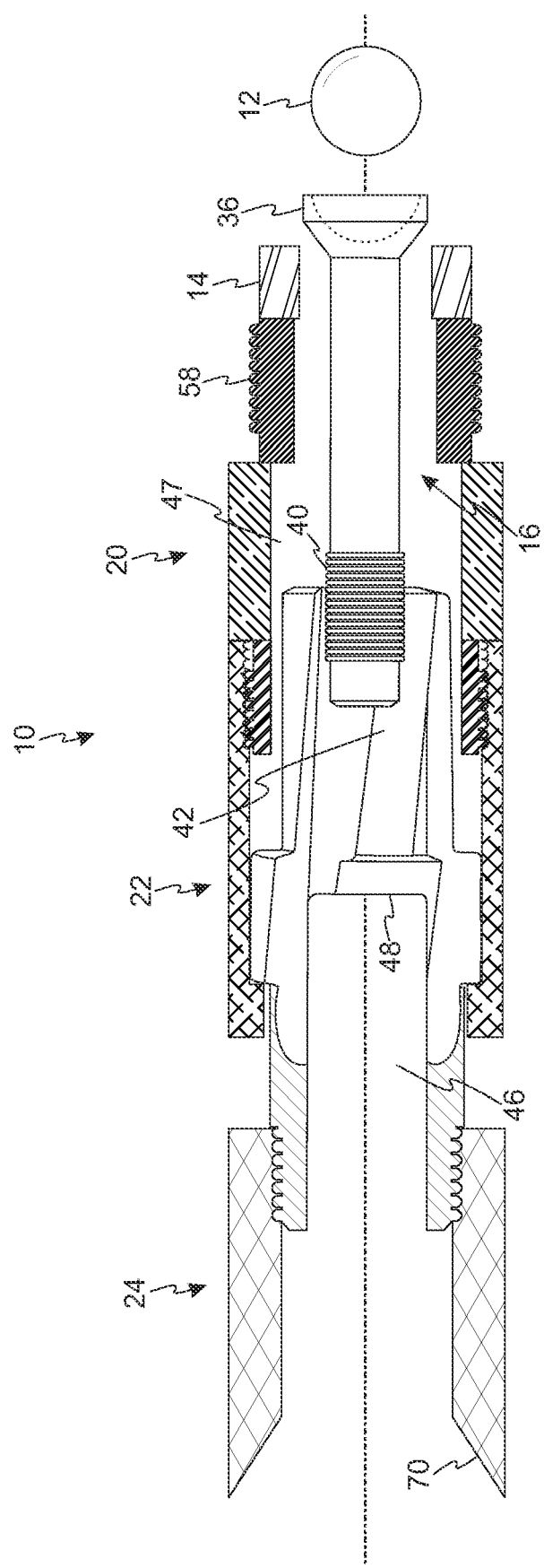
FIG. 3 is a side, cut-away view of the cyclonic, debris removing valve of FIG. 1 in a first position.

Referring first to FIGS. 1-3 there is illustrated an embodiment of a cyclonic debris removing valve 10 ("valve 10") consistent with an embodiment of the present invention. In a preferred embodiment, valve 10 comprises a ball 12, a seat 14, a hydraulic piston 16, a ported stem member 18, a containment union 20, a containment cage 22, and a drag plunger 24. In describing the structure of the valve 10 and its operation, the terms "north" and "south" are utilized. The term "north" is intended to refer to that end of the pumping system that is more proximate the pumping unit, while the term "south" refers to that end of the system that is more distal the pumping unit, or "downhole." In addition, the term "fluid" as used herein is intended to refer to any material capable of being pumped using a sucker rod pumping system, such as petroleum and water.

Figure 4:
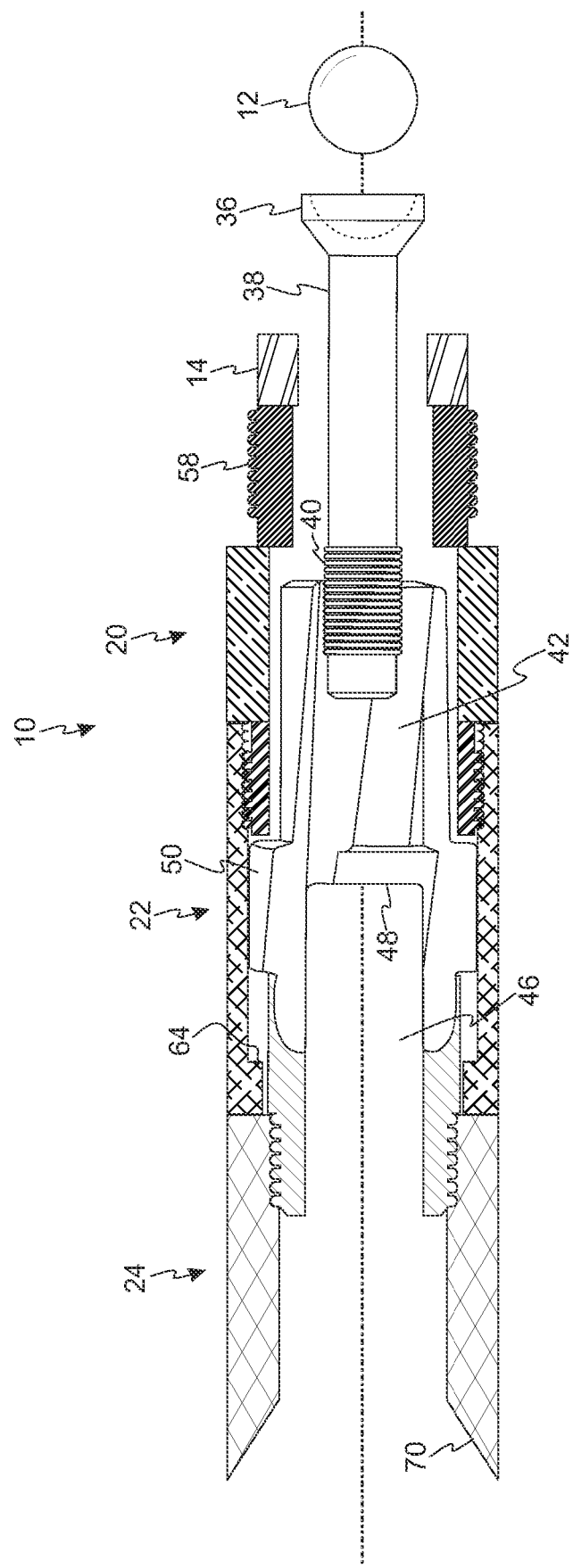
FIG. 4 is a side, cut-away view of the cyclonic, debris removing valve of FIG. 1 in a second position.
Figure 5:
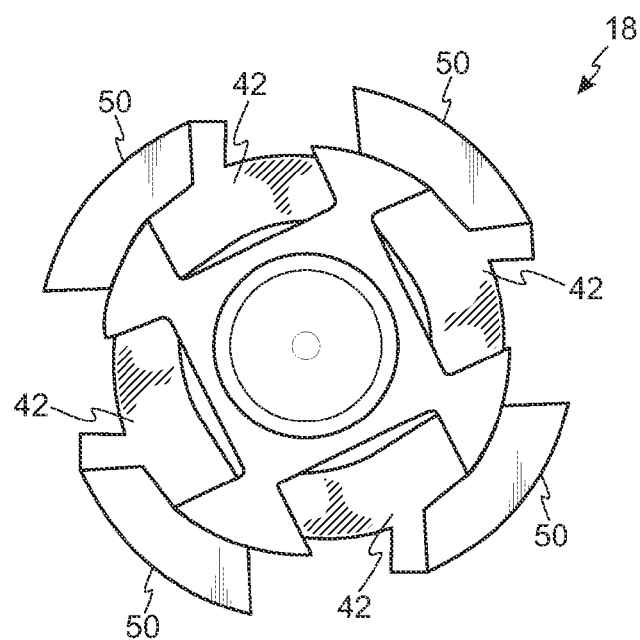
FIG. 5 is a top view of the cyclonic, debris removing valve of FIG. 1.

Referring now to FIGS. 1-4, particular attention is drawn to the hydraulic piston 16. The hydraulic piston 16 includes a pedestal 36 which, as best seen in FIGS. 3-4, has a concave surface. The pedestal 36 is dimensioned to match the radius of an external surface of a ball 12. The pedestal 36 is positioned on a shaft 38, which has an exterior threaded region 40 proximate a lower portion thereof.

The ported stem 18, a side view of which is shown in FIGS. 1-4, includes a plurality of a plurality of veins 42 is provided. While the number of veins 42 may be varied, four veins 42 are preferred. Where the valve 10 is used in the northern hemisphere, the veins 42 should be cut, from south to north, in a west to east direction. For use in the southern hemisphere, the channels should be cut in an east to west direction.

Figure 6:
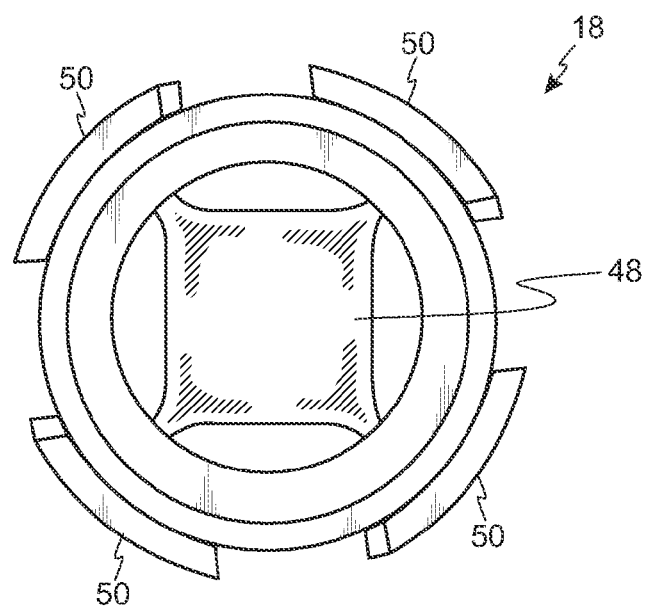
FIG. 6 is a bottom view of the cyclonic, debris removing valve of FIG. 1.

Elongated openings 44 are preferably provided in a lower portion of veins 42, to permit the passage of pumped fluid from passage 46 (see FIGS. 3-4) out of the interior of the ported stem 18 and into the upper portion of veins 42. As best shown in FIGS. 3-4 and 6, it can be seen that cap 48 is preferably positioned so that the passage 46 terminates proximate the north terminus of openings 44, so as to more effectively direct pumped fluid from the passage 46, through openings 44 and into the upper portion of veins 42.

Referring to FIGS. 1-6, and continuing to describe the ported stem 18, regions of increased circumference 50 are preferably interposed between the veins 42. The ported stem further includes, in this embodiment, an external threaded region 52 located proximate a lower portion thereof, and an internal threaded region 54 at the upper portion thereof. As described in more detail below, the external threaded region 52 facilitates coupling between the ported stem 18 and the drag plunger 24. The internal threaded region 54 permits coupling between the ported stem 18 and the hydraulic piston 16.

Referring now to the containment union 20, it preferably comprises a lower, external threaded region 56, and upper threaded region 58, and a central, non-threaded region 60 having a pair of wrench flats 62 on opposing sides thereof. The wrench flats 62 are intended to facilitate coupling and de-coupling of the containment union 20 to other components of the valve 10, as described more fully below.

The containment cage 22, as best seen in FIGS. 2-4, includes an annular, tower rim 64 and an interior threaded region 66 located at an upper portion thereof. The drag plunger 24 includes an internal, threaded region 68 at an upper portion thereof, and an angled area 70 at the bottom thereof, and defines a passage 47 therethrough. It can be seen from a review of FIGS. 2-4 that passage 46 is continuous, in a southward direction, from cap 48 through the interior of the drag plunger 24.

Beginning with the south most portion of the valve 10, its construction will now be described in more detail. In one embodiment, the containment cage 22 is positioned above the drag plunger 24, with the containment cage 22 being oriented so that the lower rim 64 of the containment cage 22 is proximate the internal threaded region 68 of the drag plunger 24. The ported stem 18 may then be inserted into the containment cage 22, oriented so that the external threaded region 52 may be threadably coupled with the internal threaded region 68 of the drag plunger 24. When these three components (the drag plunger 24, containment cage 22, and ported stem 18) are coupled in this manner, it will be seen that the ported stem 18 and containment cage 22 are capable of reciprocal movement relative to each other. Southward travel of the ported stem 18 relative to the containment cage 22 is limited by the regions 50 on ported stem 18, a lower portion of which contact the lower rim 64. Northward travel of the ported stem 18 relative to the containment cage 22 is limited by contact between a top surface of the drag plunger 24 and a lower surface of the lower rim 64.

The containment union 20 may then be positioned over the exposed, upper portion of the ported stem 18. More specifically, lower, external threaded region 56 may be threadably coupled to internal threaded region 68 of the drag plunger 24. Such coupling may be facilitated by use of the wrench flats 62. The exterior threaded region 40 of the ported stem 18 may then be inserted through passage 47 in the interior of the containment union 20, and may then be threadably coupled to the internal threaded region 54 at the upper portion of the ported stem 18.

A seat 14 may be positioned above the containment union 20, with an underside of the seat 14 contacting an upper portion of the containment union 20. The seat 14 should be positioned so that the shaft 38 extends therethrough. The interior diameter of the seat 14 should be greater than the external diameter of the pedestal 36, so that, during reciprocating movement of the pedestal 36 relative to the seat 14, the pedestal 36 is capable of passing through the interior of the seat 14. A ball 12 is positioned on top of seat 14, with northward travel of the ball 12 relative to the seat 14 being further facilitated by the pedestal 36 contacting an underside of the ball 12.

In operation, petroleum fluids pass from a lower region of a pump line to an upper region through a cyclic repetition of upstrokes and downstrokes. Beginning with a downstroke, fluid passes upward through the passage 46, commencing at a lower portion of the drag plunger 24. Fluid will continue its upward movement through passage 46, until contacting cap 48. Fluid will then be forced outward through openings 44, and will move northward through veins 42. The angling of veins 42 allows the traveling fluid to impart rotational movement of the ported stem 18, as well as the drag plunger 24 and hydraulic piston 16, relative to the containment union 20 and containment cage 22.

As the fluid continues to move northward, it will enter channel 47. The hydraulic piston 16 will also travel northward relative to the seat 14 during this process, pushing the ball 12 off the seat 14 in a controlled manner. It should be noted that the veins 42 impart cyclonic rotation on the fluid, and this movement imparts a spinning motion on ball 12. The spinning motion facilitates the removal of debris, including solids, on the ball 12, which could interfere with the seating of the ball 12 on the seat 14.

When an upstroke of the pump occurs, fluids momentarily reverse direction of flow relative, and now move in a downward direction relative to the valve 10. This fluid acts to push ball 12 and hydraulic piston 16 in a downward direction, with the ball 12 continuing such movement until resting against seat 14. The positioning of the pedestal 36 provides a more controlled downward motion of the ball 12, reducing wear and tear thereof and of the seat 14. There should be little or no spinning motion on the ball 12 during its downward travel. When ball 12 is lodged against seat 14 the valve is in the closed position. When in the closed position, fluid can no longer move downward past ball 12, and fluid positioned above ball 12 is stationary relative to the valve 10. At this point fluid is carried upward as pump continues its upstroke. Fluid that is positioned below ball 12 is sucked upward by the upward movement of pump, thus pulling additional fluid from the formation into the lower portions of the pump string.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, male threaded regions may in most instances may be made female, and vice versa, without departing from the spirit or scope of the present invention. In addition, certain of the components may be formed as a single piece, such as, for example, the containment cage 22 and containment union 20, rather than provided as separate components. Other modifications may also be possible.

Therefore, it is intended that the invention not be limited to the particular embodiment disclosed as the best mode contemplated for carrying out this invention, but that the invention will include all embodiments falling within the scope of the appended claims.

What is claimed is:

1. A valve for a pumping system comprising, in combination:
   a hydraulic piston having a north end and a south end and a pedestal at the north end thereof;
   a containment union having a north end and a sooth end and an interior passage therethrough;
   a ported stem having a north end and a south end;
   wherein the ported stem has a plurality of veins located on an exterior portion thereof, and extending in one of a west to east and an east to west direction;
   wherein a lower portion of each of the plurality of veins is open to an interior of the ported stem and wherein an upper portion of each of the plurality of veins is closed;
   wherein the ported stem further comprises a plurality of regions of increased circumference located on an exterior portion thereof, adapted to contact a lower portion of the containment union;
   wherein a lower interior portion of the ported stem defines a passage terminating at a north end thereof in a cap, and wherein there is fluid communication between the interior passage and the open lower portion of each of the plurality of veins;
   a containment cage having a north end and a south end and adapted to be reciprocally positioned over a portion of the ported stem and to be coupled at its north end to the south end of the containment union;
   wherein the containment cage further comprises an interior, annular rim proximate the south end thereof, and wherein the interior annular rim is configured to prevent movement of the regions of increased circumference thereby; and
   a drag plunger having a north end and a south end, and adapted to be coupled at its north end to the south end of the ported stem.

2. The valve of claim 1 wherein the south end of the hydraulic piston has an exterior thread.

3. The valve of claim 1 wherein the containment union has opposing wrench flats on an exterior surface thereof.

4. The valve of claim 2 wherein the north end of the ported stem has an interior threaded region, adapted to be threadably coupled with the exterior threaded region at the south end of the hydraulic piston.

5. The valve of claim 1 wherein the south end of the ported stem has an exterior threaded region.

6. The valve of claim 5 wherein the north end of the drag plunger has an interior threaded region, adapted to be threadably coupled with the exterior threaded region at the south end of the ported stem.

7. The valve of claim 1 wherein the south end of the containment union has an exterior threaded region.

8. The valve of claim 7 wherein the north end of the containment cage has an interior threaded region, adapted to be threadably coupled with the exterior threaded region at the south end of the containment union.

9. The valve of claim 1 further comprising a seat positioned proximate a north end of the containment union.

10. The valve of claim 9 wherein the pedestal is configured to be able to pass through an interior of the seat.

11. The valve of claim 9 further comprising a ball positioned above the seat.

12. A valve for a pumping system comprising, in combination:
    a hydraulic piston having a north end and a south end and a pedestal at the north end thereof;
    wherein the south end of the hydraulic piston has an exterior thread;
    a containment union having a north end and a south end and an interior passage therethrough;
    wherein the containment union has opposing wrench flats on an exterior surface thereof;
    a ported stem having a north end and a south end;
    wherein the ported stem has a plurality of veins located on an exterior portion thereof, and extending in one of a west to east and an east to west direction;
    wherein a lower portion of each of the plurality of veins is open to an interior of the ported stem and wherein an upper portion of each of the plurality of veins is closed;
    wherein the ported stem further comprises a plurality of regions of increased circumference located on an exterior portion thereof, adapted to contact a lower portion of the containment union;
    wherein a lower interior portion of the ported stem defines a passage terminating at a north end thereof in a cap; and wherein there is fluid communication between the interior passage and the open lower portion of each of the plurality of veins;
    wherein the north end of the ported stem has an interior threaded region, adapted to be threadably coupled with the exterior threaded region at the south end of the hydraulic piston;
    wherein the south end of the ported stem has an exterior threaded region;
    a drag plunger having a north end and a south end, and adapted to be coupled at its north end to the south end of the ported stem;
    wherein the north end of the drag plunger has an interior threaded region, adapted to be threadably coupled with the exterior threaded region at the south end of the ported stem;
    a containment cage having a north end and a south end and adapted to be reciprocally positioned over a portion of the ported stem and to be coupled at its north end to the south end of the containment union;
    wherein the containment cage further comprises an interior, annular rim proximate the south end thereof, and wherein the interior annular rim is configured to prevent movement of the regions of increased circumference thereby; and
    wherein the north end of the containment cage has an interior threaded region, adapted to be threadably coupled with the exterior threaded region at the south end of the containment union.

13. The valve of claim 12 further comprising a seat positioned proximate a north end of the containment union.

14. The valve of claim 13 wherein the pedestal is configured to be able to pass through an interior of the seat.

15. The valve of claim 13 further comprising a ball positioned above the seat.

16. A method for pumping fluid through a valve comprising:
providing a valve for a pumping system comprising, in combination:
a hydraulic piston having a north end and a south end and a pedestal at the north end thereof;
a containment union having a north end and a south end and an interior passage therethrough;
a ported stem having a north end and a south end;
wherein the ported stem has a plurality of veins located on an exterior portion thereof, and extending in one of a west to east and an east to west direction;
wherein a lower portion of each of the plurality of veins is open to an interior of the ported stem and wherein an upper portion of each of the plurality of veins is closed;
wherein the ported stem further comprises a plurality of regions of increased circumference located on an exterior portion thereof, adapted to contact a lower portion of the containment union;
wherein a lower interior portion of the ported stem defines a passage terminating at a north end thereof in a cap, and wherein there is fluid communication between the interior passage and the open lower portion of each of the plurality of veins;
a containment cage having a north end and a south end and adapted to be reciprocally positioned over a portion of the ported stem and to be coupled at its north end to the south end of the containment union;
wherein the containment cage further comprises an interior, annular rim proximate the south end thereof, and wherein the interior annular rim is configured to prevent movement of the regions of increased circumference thereby; and
a drag plunger having a north end and a south end, and adapted to be coupled at its north end to the south end of the ported stem; and
pumping fluid northward through the valve by causing the fluid to enter the south end of the drag plunger, to then enter the interior of the ported stem, to then exit the interior of the ported stem and to enter the plurality of veins, to then enter an interior of the containment cage, and to then enter the interior passage of the containment union.

17. The method of claim 16 further comprising positioning a seat proximate a north end of the containment union and wherein the pumped fluid passes through an interior of the seat.

18. The method of claim 17 wherein the pedestal is configured to be able to pass through an interior of the seat and wherein, during a downstroke, the pedestal travels northward through the interior of the seat.

19. The method of valve of claim 18 further comprising positioning a ball above the seat and wherein, during the downstroke, the pedestal pushes the ball off of the seat.

* * * * *